Patented Aug. 8, 1939

2,169,192

UNITED STATES PATENT OFFICE 2,169,192

HYDROCARBONS FROM VACUUM DISTILLATION OF FISH OIL

James G. Baxter, Rochester, N. Y., assignor, by mesne assignments, to Distillation Products, Inc., Rochester, N. Y., a corporation of Delaware No Drawing. Application June 12, 1936, Serial No. 84,870

6 Claims. (Cl. 260—676)

This invention pertains to processes of vacuum distillation of marine animal oils and products produced thereby.

It is an object of this invention to provide an improved vacuum distillation process. Another object is to provide an improved process of high vacuum and particularly molecular distillation of fish oils, whereby heretofore unknown products can be produced. A still further object is to provide new and useful compositions of matter. Other objects will appear hereinafter.

I have found that by subjecting marine animal oils, such as fish oils to vacuum distillation and particularly high vacuum or molecular distillation, that new products having unique properties and extensive utility can be separated as a distillate.

In carrying out my invention, I subject a marine animal oil such as cod-liver oil to vacuum distillation, preferably at a pressure considerably below 10 mm. In order to avoid decomposition, it is desirable to employ a still having evaporating and condensing surfaces separated by free unrestricted space so that vaporized molecules can travel to the condensing surface without compression as a result of high vapor pressure necessary to force them through restrictions in the path of travel. An especially desirable form of still is one constructed in a manner similar to a molecular still, the condensing and evaporating surfaces being relatively close together and having a somewhat similar area. When the space between the surfaces is evacuated, molecules travel directly to the condensing surface by convection or diffusion. While higher pressures may be used, I prefer to employ those below 10 mm. and preferably below 1 mm.

Molecular distillation conditions may also be employed. This type of distillation differs from the above described method of distillation in that a high vacuum sufficient to give an appreciable mean free path is used and the distance separating the condensing and evaporating surfaces is less than approximately the mean free path. Unrestricted space separates the two surfaces so that a substantial proportion of vaporized molecules travel directly to the condensing surface without substantial collision with residual gas molecules or other vapor molecules.

This type of distillation is customarily employed when very non-volatile heat labile compounds are to be treated. Since the new product has a rather high volatility as compared with such compounds and does not decompose on boiling at ordinary pressure it is unnecessary to use such distillation conditions. However, high vacuum and especially molecular distillation enables a faster rate of distillation and also prevents decomposition of the body of the oil and therapeutic constituents and therefore constitutes the preferred mode of operation.

It has furthermore been found that the new products can be isolated simultaneously with the distillation of marine oils to recover distillates of fat soluble vitamins. In subjecting such oils to high vacuum or molecular distillation in the manner described in U. S. Patent 1,925,559 to Hickman it has been found that the new product can be condensed in the degassing stage and especially during the distillation by removing it as a lower boiling fraction or by placing cooled traps in the conduits leading to the vacuum pumps which maintain the low pressure during the degassing or distillation treatment. Since the new products are considerably more volatile than most of the therapeutic constituents they distill at a lower temperature than the vitamins and can be removed as a first fraction or can be distilled with the first vitamin fraction at 70°–140° C. and recovered from the mixture. Also because of its relatively higher vapor pressure, substantial amounts are withdrawn into the evacuation conduits of the various units of the still. There, due to the lower temperature of the traps, condensation takes place and recovery effected. This mode of operation thus enables recovery of therapeutic constituents and the new products in one distillation treatment at an expense no greater than that involved in the distillation to recover the therapeutic materials alone.

*Example*

Cod-liver oil was subjected to molecular distillation at a temperature between 90° and 250° C. in a multi-unit molecular still, a vitamin A alcohol fraction being withdrawn in the first still at 90°–125° C., a vitamin D fraction at 135°–165° and a vitamin A ester fraction at 180°–235° C. The conduits through which each still was evacuated to about .001–.003 mm. were provided with a trap cooled with dry ice and acetone. After completion of the distillation the contents of the traps were collected and saponified with aqueous potassium hydroxide.

The non-saponifiable portion, which represented about 53% of the total material was shown to be a mixture of saturated hydrocarbons by its nearly complete immiscibility with cold concentrated sulfuric acid. The portion purified by washing with this reagent distilled at ordinary pressure, without decomposition, at 265°–310° C. and at 125°–177° at 12 mm. pressure. The fraction was exceptionally resistant to oxidation and thermal decomposition and had an unusually low melting point of about −21° C. It was mainly composed of hydrocarbons having the probable formula of $C_{15}H_{32}$ to $C_{19}H_{40}$.

This fraction was subjected to distillation and the following portions segregated.

1st fraction
 B. P. (12 mm.) 160–164° C.
 M. P. —22° C.
2nd fraction
 B. P. (12 mm.) 164°–168° C.
 M. P. —20° C.
3rd fraction
 B. P. (12 mm.) 168°–172° C.
 M. P. —18° C.

The first fraction was mainly composed of hydrocarbons having the probable formula $C_{15}H_{32}$ to $C_{16}H_{34}$. The second fraction was mainly composed of hydrocarbons having a probable formula of $C_{16}H_{34}$ to $C_{17}H_{36}$. The third fraction was mainly composed of hydrocarbons having a probable formula of $C_{17}H_{36}$ to $C_{19}H_{40}$.

The second fraction which represented the major portion of the fraction initially distilled was subjected to redistillation and a fraction having the following properties removed:

B. P. (760 mm.) = 301°–304° C. (without decomposition).
 *B. P. (10 mm.) = 157.5° C.
 M. P. = —21° C.
 $D_4^{25}$ = .7837
 $D_4^0$ = .8009
 % C = 85.24
 % H = 14.87
 M. W. = 240–245

Probable empirical formula $C_{17}H_{36}$. The compound was stable to boiling aqueous potassium permanganate and to warm concentrated nitric acid.

*Actual pressure over distilling liquid surface. All other reduced pressures measured by manometer attached to trap leading to vacuum pump.

When subjecting fish oils to molecular distillation to recover vitamins as well as the new products, the therapeutic distillate should be condensed upon a condensing surface which is located at a distance from the evaporating surface of less than about the mean free path of the molecules of residual gas. This distance is inversely proportional to the pressure and with very low pressures a considerable distance can be used. Distances of less than 10 inches such as ½ to 6 inches have been found to be most satisfactory. Pressures for molecular distillation should be less than .1 mm. and preferably less than .01 mm. such as .005 to .00001 mm. Due to the greater volatility and stability of the hydrocarbon distillate, the trap or condenser where it is condensed may be located at a distance from the evaporative surface of many times the mean free path. Temperatures of between 50° and 300° may be used, those between 70° and 200° being most satisfactory when employing molecular conditions. Higher temperatures such as 100° to 250° C. are preferred when non-molecular distillation is used.

While I have found it convenient to describe my invention by reference to specific fish oils, the new products can be recovered in the same manner from marine animal oils in general such as, halibut-liver, salmon, sardine, herring, menhaden, tuna, mackerel, whale, seal and other marine animal, liver and body oils.

The new hydrocarbons are obtained in amounts of 10 to 100 parts per million of oil treated. It is not known whether the hydrocarbons are present in the fish oil or are formed during the distillation treatment, possibly by pyrolysis of acids or glycerides present therein.

It is seen that the new substances are unusually stable towards heat, oxidation and chemical reagents and that they have an abnormally long range between freezing point and boiling point. These properties excellently suit the materials for use as fillings for thermometers and as lubricants for guns, watches, scientific instruments and other delicate mechanisms. They are also useful as softeners for organic plastic materials, as fillings for manometers and condensation pumps and as vehicles for scents and essences. They may be used advantageously in many other applications and fields.

What I claim is:

1. As a new composition of matter obtainable by vacuum distillation of a fish oil and being composed of saturated hydrocarbons having a probable formula of or between $C_{15}H_{32}$ and $C_{19}H_{40}$ and boiling without decomposition at between 265 and 310° C. at 760 mm. and at between 125° and 177° at 12 mm., having a melting point of between —18° and —22° C. and being resistant to boiling with aqueous potassium permanganate.

2. As a new composition of matter obtainable by vacuum distillation of a fish oil and being a mixture of saturated hydrocarbons boiling without decomposition at between 265° and 310° C. at 760 mm. pressure and at between 125° and 177° at 12 mm. pressure having a melting point of about —21° C., a probable formula of or between $C_{15}H_{32}$ and $C_{19}H_{40}$ and being resistant to oxidation.

3. A new composition of matter obtainable by vacuum distillation of a fish oil and being composed of saturated hydrocarbons having a probable formula of $C_{15}H_{32}$ to $C_{16}H_{34}$ and having a boiling point of about 160° C. to 164° C. at 12 mm. pressure, a melting point of about —22° C. and being resistant to oxidation and thermal decomposition.

4. As a new composition of matter obtainable by vacuum distillation of a fish oil and being composed of saturated hydrocarbons having a probable formula of $C_{16}H_{34}$ to $C_{17}H_{36}$ and having a boiling point of about 164°–168° C. at 12 mm. pressure, a melting point of about —20° C. and being resistant to thermal decomposition and oxidation.

5. A new composition of matter obtainable by vacuum distillation of a fish oil and being composed of saturated hydrocarbons having a probable formula of $C_{17}H_{36}$ to $C_{19}H_{40}$ and which has a boiling point of about 301–304° C. at 760 mm. pressure and about 167.5° C. at 10 mm. pressure, a melting point of about —21° C. and being substantially stable to boiling aqueous potassium permanganate.

6. A substantially pure saturated hydrocarbon obtainable by vacuum distillation of a fish oil having a probable formula of $C_{17}H_{36}$, a boiling point of about 301–304° C. at 760 mm. and about 157.5° C. at 10 mm., a melting point of about —21° C., a molecular weight of approximately 240–245 being substantially stable to boiling aqueous potassium permanganate and to warm concentrated nitric acid and having a density at 26° C. of about .7838.

JAMES G. BAXTER.